United States Patent [19]
Lang

[11] Patent Number: 5,205,135
[45] Date of Patent: Apr. 27, 1993

[54] HELICAL CONVEYOR FREEZER

[75] Inventor: Gary D. Lang, Wooster, Ohio

[73] Assignee: Liquid Carbonic Corporation, Chicago, Ill.

[21] Appl. No.: 791,893

[22] Filed: Nov. 13, 1991

[51] Int. Cl.⁵ .............................................. F25D 25/02
[52] U.S. Cl. .......................................... 62/381; 62/63; 99/517
[58] Field of Search ........................... 62/381, 63, 62; 198/778; 99/517

[56] References Cited

U.S. PATENT DOCUMENTS

| | | | |
|---|---|---|---|
| 2,791,889 | 5/1957 | Childers | 62/381 |
| 3,269,142 | 8/1966 | De Mola et al. | 62/381 |
| 3,315,492 | 4/1967 | Dreksler . | |
| 3,391,548 | 7/1968 | Gram | 62/381 |
| 3,412,476 | 11/1968 | Astrom . | |
| 3,443,505 | 5/1969 | Kaufman, Jr. | 62/381 X |
| 3,733,848 | 5/1973 | Duron et al. | 62/381 |
| 3,866,432 | 2/1975 | Harrison . | |
| 4,023,381 | 5/1977 | Onodera . | |
| 4,056,950 | 11/1977 | Kaufman, Jr. . | |
| 4,078,394 | 3/1978 | Chamberlain et al. . | |
| 4,103,768 | 8/1978 | Persson | 62/381 X |
| 4,164,129 | 8/1979 | Stueber | 62/381 X |
| 4,177,647 | 12/1979 | Overbye | 62/381 X |
| 4,226,093 | 10/1980 | Voitko . | |
| 4,356,707 | 11/1982 | Tyree, Jr. et al. | 62/381 |
| 4,480,535 | 11/1984 | Jaxmar et al. | 62/381 X |
| 4,612,780 | 9/1986 | Briley et al. . | |
| 4,739,623 | 4/1988 | Tyree, Jr. et al. . | |
| 4,798,062 | 1/1989 | Lipinski . | |
| 4,866,946 | 9/1989 | Klee | 62/381 X |
| 4,875,343 | 10/1989 | Jeppsson . | |
| 4,953,365 | 9/1990 | Lang et al. | 62/381 |
| 5,020,330 | 6/1991 | Rhoades et al. . | |
| 5,042,262 | 8/1991 | Gyger et al. | 62/381 X |

OTHER PUBLICATIONS 2 page Sales Brochure on York Series S Spiral Freezing System.

*Primary Examiner*—Henry A. Bennet
*Assistant Examiner*—Christopher B. Kilner
*Attorney, Agent, or Firm*—Fitch, Even, Tabin & Flannery

[57] ABSTRACT

A food freezer for continuous freezing of food products utilizing a helical conveyor for transporting the food products through an enclosure having a first cooling zone in which the food products are cooled sufficiently to freeze the exterior surface, and a second cooling zone in which the interior of the food products are frozen. Refrigeration apparatus cools an atmosphere gas within the enclosure and baffle means directs the coldest gas through the food products in the first cooling zone and the gas from the first cooling zone is circulated to the second cooling zone where it passes across the food products in a direction opposite to the direction of travel through the second cooling zone.

25 Claims, 6 Drawing Sheets

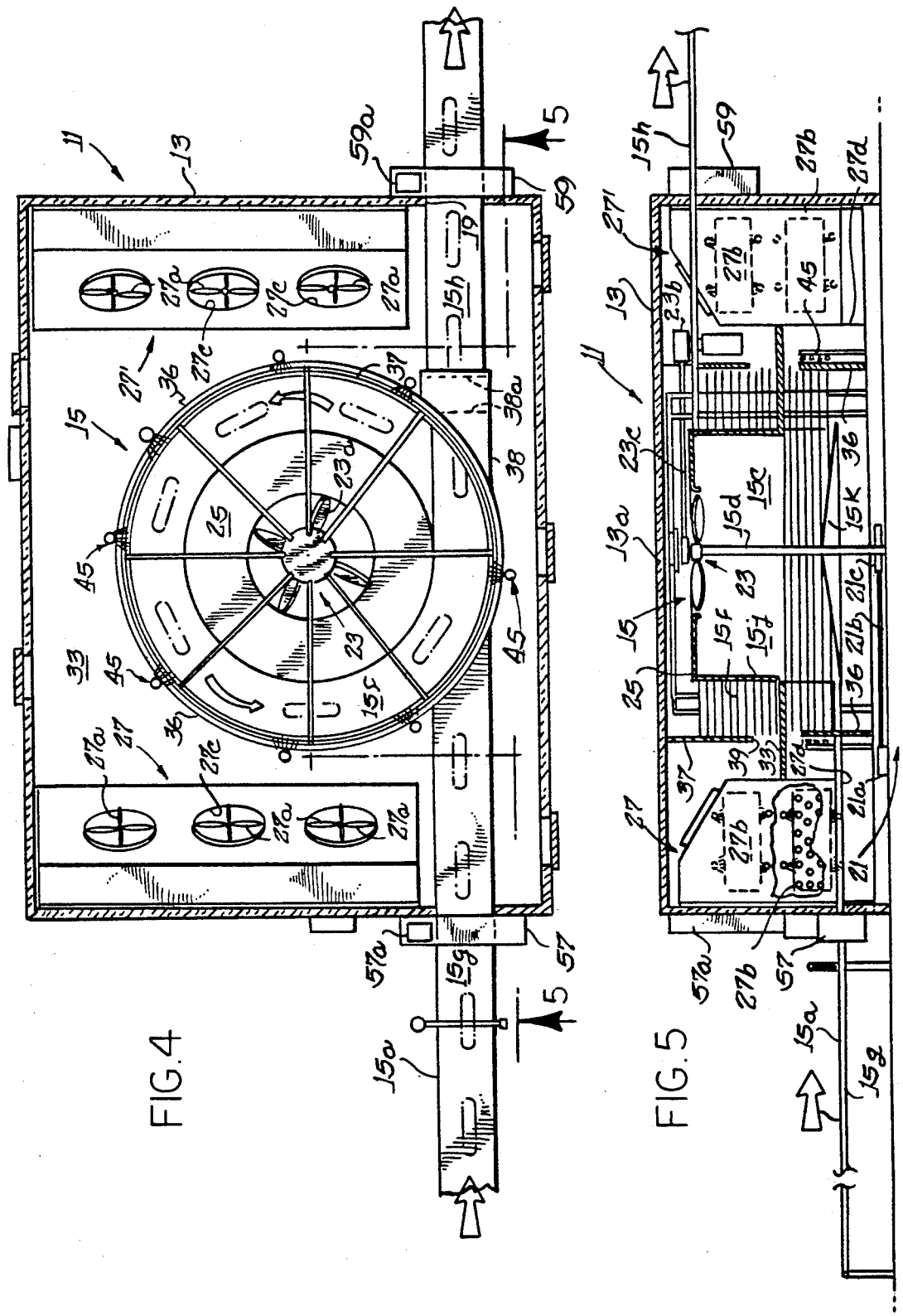

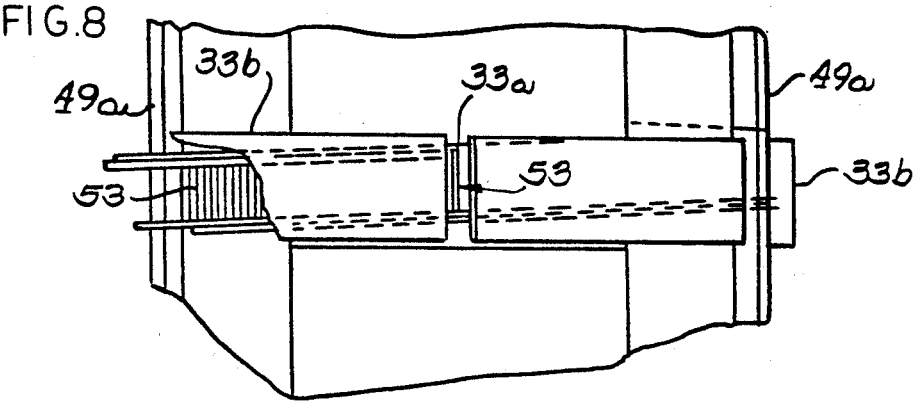
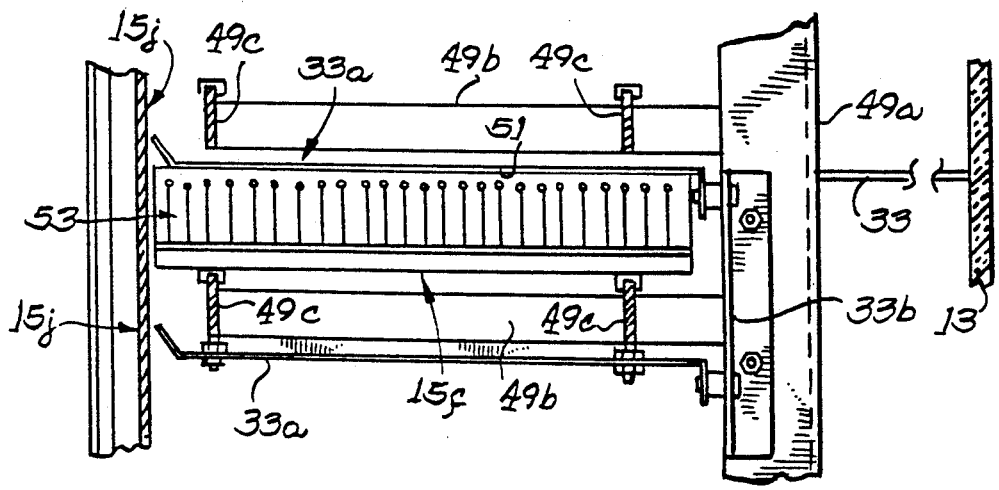
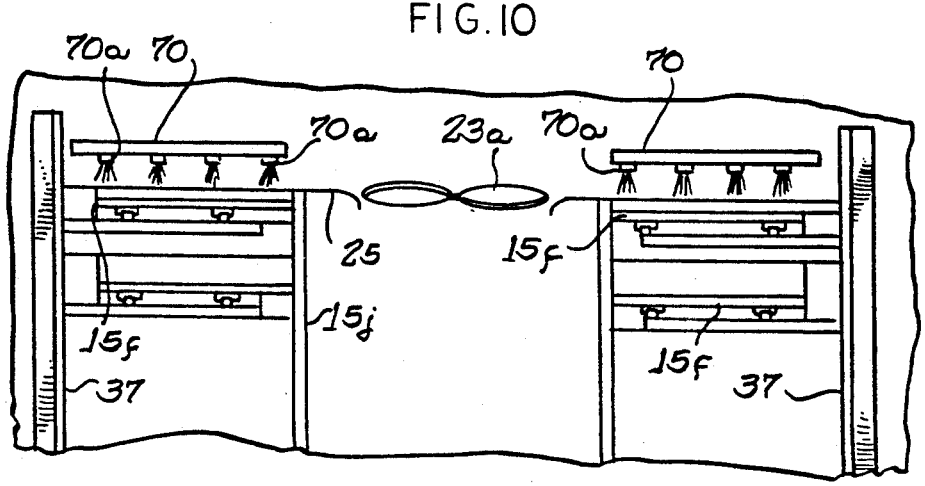

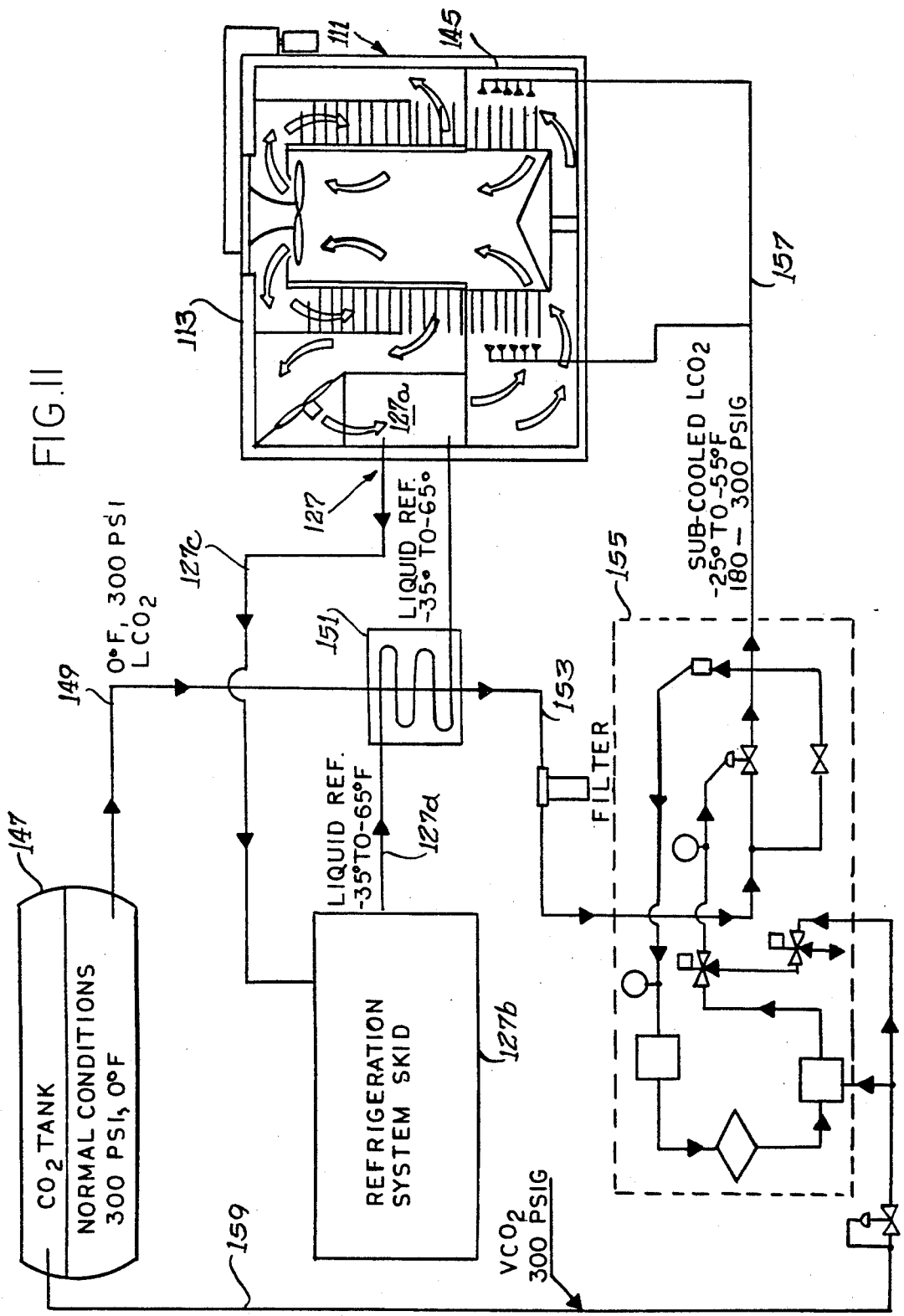

HELICAL CONVEYOR FREEZER

This invention relates generally to food freezing apparatus and, more particularly, to a continuous food freezer having a helical conveyor on which food products are conveyed through an insulated enclosure, while the food products are subjected to a cooling medium during the period in the insulated enclosure.

BACKGROUND OF THE INVENTION

It has been common practice in recent years to use helical or spiral conveyors in connection with continuous food freezers. The helical or spiral configuration provides a substantial length of conveyor within which the freezing of the food may be accomplished in a more restricted space than would be possible with a straight, in-line type of conveyor freezer. These helical conveyor freezers typically included an insulated chamber or enclosure with an entrance opening located in the sidewall toward the bottom of the enclosure. The exit opening is located in a wall opposite the entrance opening but toward the top of the enclosure. The helical conveyor is centrally located in the enclosure, having a vertical axis on which a cylindrical drum is positioned to drive the conveyor. The superimposed flights or tiers of the conveyor transfer the food products from an entrance section, which extends from the entrance opening to the bottom flight, where the food products move upwardly on successive flights and discharge on an exit section that extends from the uppermost flight out through the exit opening.

While the mechanical means for supporting the conveyor varies to some extent, it basically consists of an open frame positioned around the helical conveyor with support members extending inwardly to mount helically disposed rails which support a flexible, open mesh belt. The inner edge of the belt rests against the rotating driven drum which causes the various flights of the conveyor to rotate and progress upwardly on the supporting rails.

In the prior art of helical conveyor food freezers, there are different means used to freeze the food products. In the earlier helical conveyor food freezers, the freezing means was typically a mechanical refrigeration system having evaporator coils within the insulated enclosure to cool air circulated therein across the food products. There are also examples in the prior art of helical conveyor food freezers which utilize cryogenic cooling in the form of sprayed liquid nitrogen or liquid $CO_2$. The cryogenic freezers use various combinations of liquid cryogen, condensed vapor as snow or cryogen vapor to cool or freeze the food products.

U.S. Pat. No. 3,412,476 to Astrom is directed to a helical conveyor food freezer having mechanical refrigeration and arrangements of cylindrical baffles coaxial with the conveyor to direct the cooling medium through the flights of the conveyor in a direction opposite to the movement of the foods products. U.S. Pat. No. 3,315,492 to Dreksler discloses a helical conveyor freezer having mechanical refrigeration and fan means for directing the air flow downwardly into the core of the conveyor and outwardly across the food products on the various flights of the conveyor.

U.S. Pat. No. 4,023,381 to Onodarow discloses a helical conveyor food freezer having mechanical refrigeration and fan means located in the core or center of the helical conveyor arranged to circulate cooling air horizontally and diametrically with respect to the conveyor, with generally cylindrical baffle means enclosing the conveyor to maintain the cooling medium therein. U.S. Pat. No. 4,056,950 to Kaufmann, Jr. is similar to the Onodarow patent in showing a continuous helical conveyor food freezer having mechanical refrigeration and generally horizontal air flow across the helical conveyor. U.S. Pat. No. 4,426,093 to Voitko also discloses a continuous helical conveyor freezer having mechanical refrigeration and air flow which is directed generally downwardly through the flights of the vertical conveyor.

U.S. Pat. No. 4,612,780 to Briley et al. similarly shows a continuous helical conveyor having cooling air flow across and through the helical conveyor as the air moves generally downwardly. Cylindrical baffles and conical baffles are used to direct the air flow in the Briley et al. patent. Briley et al. also teaches reversal of the air flow, using up flow, with the products moving either upwardly or downwardly on a helical conveyor. U.S. Pat. No. 4,798,062 to Lipinski et al. shows a continuous helical conveyor freezer having mechanical refrigeration means and including baffle means to direct air flow downwardly through the core of the conveyor and upwardly through the flights of the conveyor.

U.S. Pat. No. 4,875,343 to Jeppsson discloses a continuous helical conveyor freezer having mechanical refrigeration and disclosing many different embodiments insofar as air flow is concerned. In the embodiment of FIG. 2, the air flow is generally downwardly in the core of the conveyor and radially outwardly through the various flights of the conveyor, the air dividing, passing upwardly and downwardly through the conveyor and back to the air circulation means. FIGS. 14, 15 and 16 show alternative air flow patterns in which the cooling media passes upwardly through the entire length of the helical conveyor or enters the side and moves horizontally around the periphery of the conveyor or enters from the outside and moves upwardly and downwardly from the center part of the conveyor, as shown in FIG. 16.

There are various prior art patent disclosures of cryogenically cooled helical conveyor food freezers of less relevance to the present invention; these patents are noted as including the patents to Chamberlain et al., U.S. Pat. No. 4,078,394; Harrison U.S. Pat. No. 3,866,432; Styley Jr. et al., U.S. Pat. No. 4,739,623; and Loades et al, U.S. Pat. No. 5,020,330.

In the fast freezing of food products, there is a problem of food dehydration during the freezing process. The heat exchange medium engaging the product is often air which has little moisture, and therefore tends to pick up moisture from the food. Accordingly, it is important to contact the food products with a sufficient amount of the cooling medium to drop the temperature of the food quickly and form a crust on the outer surface of the food products to prevent the further loss of moisture. Moisture loss is undesirable from two standpoints. First, it reduces the weight of the product, which since the product is sold by the pound, reduces its value. In addition, the dehydration of the food generally results in a deterioration in the quality of the product. For these reasons, it is desirable to minimize the time period in which the food products are cooled to the point of forming an outer crust which then greatly reduces the further loss of moisture.

The most rapid cooling is known to be accomplished by cryogenic cooling using liquid $CO_2$ or nitrogen, to obtain the greatest difference in temperature between the food products and the cooling medium. Cryogenic cooling is also preferred since it has much less dehydrating effect than does the dry air resulting from mechanically refrigerated systems. However, the deterrent to the universal application of cryogenic cooling to all food-freezer applications is the fact that it, in most instances, is considerably more expensive than the use of mechanical refrigeration. In an effort to obtain a balance between operating cost and performance, there have been continuous food freezers which employ a combination of mechanical refrigeration and cryogenic cooling. One such freezer is disclosed in copending U.S. application Ser. No. 704,806, filed May 23, 1991, and assigned to the same Assignee as the present application.

There are means of improving the efficiency of continuous food freezers utilizing mechanical refrigeration or combinations of mechanical refrigerations and cryogenic cooling. In order to quickly cool incoming food products, it is important that a continuous type food freezer be arranged to deliver the cooling medium to the incoming food products at its lowest temperature. In addition, to operate the mechanical refrigeration means at the most efficient level, it is desirable to extract as much heat as possible from the cooling media before it is recirculated back to the heat exchange coils of the mechanical refrigeration apparatus. It would be desirable to provide air flow within a continuous helical conveyor food freezer, to satisfy both of the abovedescribed objectives.

SUMMARY OF THE INVENTION

The present invention relates to a helical or spiral conveyor food freezer which is adapted to freeze food products on a continuous basis. The conveyor is received within an insulated enclosure along with refrigeration apparatus for cooling an atmosphere gas within the enclosure. The enclosure is divided into a first cooling zone and a second cooling zone through which the helical conveyor transports the food products. The refrigeration apparatus is disposed to supply the coldest atmosphere gas to the first cooling zone to cool the food products sufficiently to produce a crust or frozen exterior surface.

The first cooling zone is separated from the second cooling zone by baffle means which directs the atmosphere gas, which has been warmed by passing over the food products in the first cooling zone, to the second cooling zone. In the second cooling zone, the atmosphere gas is passed through the conveyor in the vertical direction and in a direction opposite to the movement of the food products. Thus, the atmosphere gas in the second cooling zone engages the coolest food products first, and then passes across progressively warmer or less cooled products. This flow pattern for the atmosphere gas produces an efficient heat transfer to the food products and extracts as much cooling as possible from the atmosphere gas before it is recirculated back to the refrigeration apparatus. The quick cooling in the first cooling zone reduces to a minimum the moisture loss in the food products for a given temperature of atmosphere gas from the refrigeration apparatus.

The refrigeration apparatus used in the practice of the present invention may take several different forms. There are many types of food products which are suited to freezing using mechanical refrigeration as a consequence of lower cost of cooling with mechanical refrigeration as compared with cryogenic cooling, which is more expensive. It is desirable to use a combination of cryogenic and mechanical refrigeration in freezing more expensive food products where the loss in value of the product due to moisture loss can exceed the added cost of cryogenic cooling. In the situations where cryogenic cooling can be justified on a product cost standpoint, the refrigeration apparatus would include cryogenic spray apparatus in the first cooling zone. The spray apparatus directs liquid $CO_2$ or liquid nitrogen across the food products on the conveyor in the first cooling zone.

The circulation means for the atmosphere gas in the enclosure forces the $CO_2$ vapor resulting from the spray, as well as the gas cooled by the mechanical refrigeration, from the first cooling zone into the second cooling zone. The $CO_2$ spray accelerates the rate of freezing the surface of the food products in the first cooling zone and augments the cooling produced by the atmosphere in the second cooling zone.

Baffling means which accomplishes the circulation of the atmosphere gas described above includes a generally horizontally extending partition that divides the portion of the enclosure outside of the helical conveyor into a low pressure area above the partition, and a high pressure area below the partition with the mechanical refrigeration apparatus and its gas circulation means forcing the atmosphere gas from the low pressure area to the high pressure area. The atmosphere gas passing from the first cooling zone to the second cooling zone moves upwardly within the central core or cage of the conveyor with a cylindrical imperforate wall provided to keep the atmosphere gas from moving radially outwardly until it reaches the uppermost flight of the helical conveyor, at which time it moves outwardly and then downwardly through the second cooling zone. A second cylindrical baffle surrounds the helical conveyor and extends from the top wall of the enclosure downwardly with its lower end spaced above the horizontal partition leaving an annular gap through which atmosphere gas may exit the second cooling zone and pass to the input of the mechanical refrigeration apparatus. Suitable control means are provided to vary the proportion of cooling by the mechanical refrigeration apparatus, as compared to the cooling by the cryogenic means.

An object of the present invention is to provide an improved food freezer having mechanical refrigeration with atmosphere circulation means forcing atmosphere gas successively through several cooling zones.

Another object of the present invention is to provide an improved food freezer having a helical conveyor with refrigeration apparatus and atmosphere gas circulation means to cool food products quickly with low temperature gas in a first cooling zone adjacent the freezer entrance and to cool or freeze food products in a second cooling zone in which the atmosphere gas circulates counter to the direction of product movement to better equilibrate the product.

Still another object of the present invention is to provide an improved food freezer having a helical conveyor transferring food products upwardly in an insulated enclosure and refrigeration apparatus circulating a cooling atmosphere gas across the lower initial flights of the conveyor and then downwardly through the upper flights of the conveyor.

Another object of the present invention is to provide an improved food freezer utilizing mechanical refrigeration and liquid cryogen cooling in combination with a helical conveyor arranged in a first cooling zone for rapid cooling of incoming products, and a second cooling zone for less rapid cooling using atmosphere gas circulation in a direction opposite to the direction in which the food products move.

These and other objects of the invention should be apparent from the following detailed description for carrying out the invention when read in conjunction with the accompanying drawings.

BRIEF DESCRIPTION OF THE DRAWING

FIG. 4 is a top plan view of the freezer of FIG. 1 with portions cut away for illustrative purposes;

FIG. 5 is a vertical section taken on line 5—5 of FIG. 4;

FIG. 8 is a schematic elevational view with portions cut away of the baffle of FIG. 7;

FIG. 9 is an enlarged, fragmentary vertical sectional view taken on line 9—9 of FIG. 7;

FIG. 10 is a schematic vertical sectional view of a helical conveyor of an alternative embodiment; and FIG. 11 is a schematic diagram of an alternative refrigeration system usable in connection with the present invention.

DETAILED DESCRIPTION OF THE PREFERRED EMBODIMENTS

Figure 1:
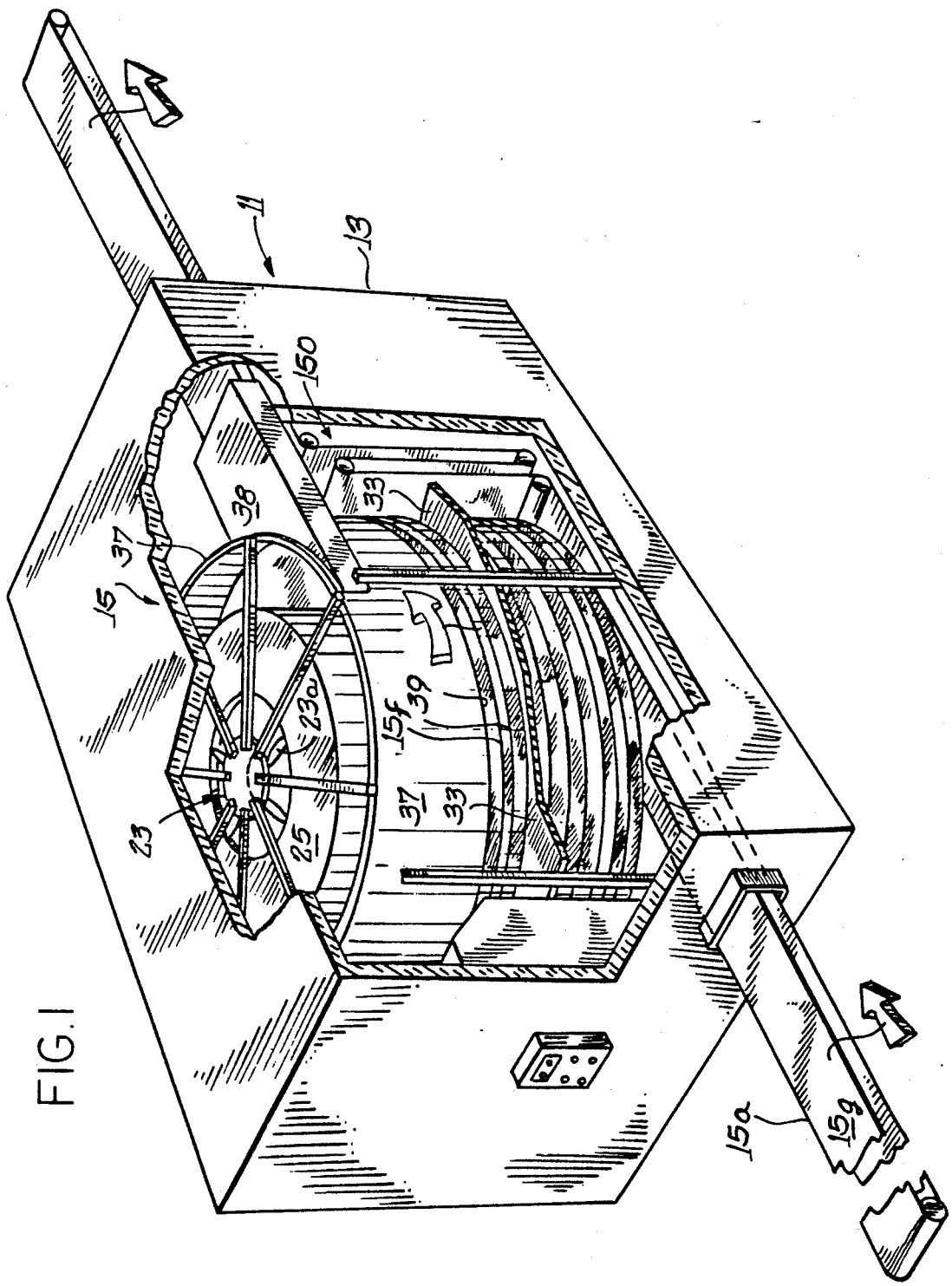
FIG. 1 is a perspective view of the helical conveyor food freezer embodying the invention, portions of the insulated housing and baffling being cut away for illustrative purposes.

Illustrated in FIGS. 1, 4 and 5 of the drawings is a food freezer 11 which is a continuous type freezer being adapted to receive food products at an input opening and to freeze the products while conveying them through the freezer to an exit opening. The food products processed through such a freezer would typically be at room temperature or, in the case of some precooked foods, at a considerably elevated temperature of between 150° F. and 200° F. As discussed earlier, the rate at which such food products are frozen has a substantial effect on the quality of the frozen processed product. It is generally recognized that moisture loss will vary considerably between freezers cooling with conventional mechanical refrigeration apparatus and freezers cooling with liquid cryogen such as $CO_2$ or nitrogen. The expected moisture loss in an entirely cryogenic freezer is on the order of one percent with the moisture loss in a typical mechanical refrigeration freezer being on the order of 3% to 7%. While the operating costs of cryogenic systems are high compared to mechanical refrigeration systems, when the cost per pound of the product is over one dollar, the 2% to 6% weight saving through cryogenic cooling begins to justify its use, at least in combination with mechanical refrigeration.

The freezer apparatus 11 includes a thermally insulated enclosure 13 within which there is a mounted helical or spiral conveyor 15. The use of such helical conveyors in food freezers is known and preferred since it permits one to fit a relatively long conveyor into a compact space. This results in a small enclosure to house the conveyor 15. The conveyor 15 is of generally conventional construction having an elongated belt 15a which is of an open mesh construction and fabricated of stainless steel.

The conveyor belt 15a is wrapped around an idler roller at the entrance end outside of the entrance opening 17 and around a driven tensioning roller at the exit opening 19 and is provided with a take-up mechanism 15b which is of conventional design. For the purpose of supporting and driving the spiral conveyor 15, there is provided a central core or cage 15c which rotates about a vertical axle 15d and which is in engagement with the inner edge of the belt 15a. The cage 15c is rotated by a drive mechanism 21, which includes a motor 21a connected to the lower end of the axle 15d by a roller chain 21b and sprocket 21c.

The spiral conveyor 15 includes a plurality of loops or flights 15f, each consisting of one helical loop about the core or cage 15c. As shown in FIG. 4, the belt 15a has a straight entrance portion 15g which extends from outside of the enclosure 13 through the entrance opening 17 to the lowermost flight of the helically disposed portion of the spiral conveyor 15. Similarly, there is an exit portion 15h which extends from the uppermost flight 15f to a position beyond the exit opening 19. The manner in which the various flights or loops of the belt 15a of the spiral conveyor 15 are supported and driven by the cage 15c is shown and described in prior U.S. Pat. Nos. 4,356,707 to Tyree, Jr. et al., 4,878,362 to Tyree, Jr., and 4,953,365 to Lang et al., the disclosures of which are incorporated herein by reference. U.S. Pat. No. 4,878,362 to Tyree, Jr. discloses an expanding spiral conveyor belt which is suitable for use as the belt 15a, having an open construction through which cooling air may readily circulate.

For the purpose of controlling and directing the flow of cooling air through the enclosure 13, the cage 15c is formed with an imperforate, cylindrical wall 15j, which extends from above the uppermost flight of the conveyor 15 to a point below the midpoint of the conveyor 15. As is best shown in FIG. 5, the imperforate cylindrical wall 15j is coaxial with the cage 15c. The peripheral wall of the cage 15c below the cylindrical wall 15j is opened to provide for the free circulation of cooling air across the lower flights of the conveyor 15 into the volume within the cage 15c.

At the bottom of the cage 15c, there is provided a bottom wall 15k, which is slightly conical in shape having its apex at the axle 15d and its lower peripheral edge secured to the lower peripheral edge of the cage 15c. The conical wall 15k is imperforate, thus leaving an annular opening or perforate area between the outer edge of the conical wall 15k and the cylindrical wall 15j through which air may pass into the volume defined by the cage 15c.

At the upper end of the cage 15c, there is provided a fan 23, having an impeller 23a, a drive motor 23b, and a drive shaft 23c connecting the motor and the impeller. Surrounding the fan 23 is an imperforate wall 25 which forms a shroud for the fan 23 to restrict any air passing axially through the cage 15c to pass through the opening within which the impeller 23a rotates.

Before considering the details of the refrigeration apparatus for cooling the atmosphere gas within the enclosure 13, consideration will be given to the atmosphere gas flow path through the food products carried by the spiral or helical conveyor 15. In this connection, attention is directed to FIGS. 2 and 3, which illustrate schematically the cooling atmosphere gas flow in, first, a purely mechanically refrigerated freezer and, second, in a freezer which is cooled by a combination of mechanical refrigeration and cryogenic cooling.

Figure 2:
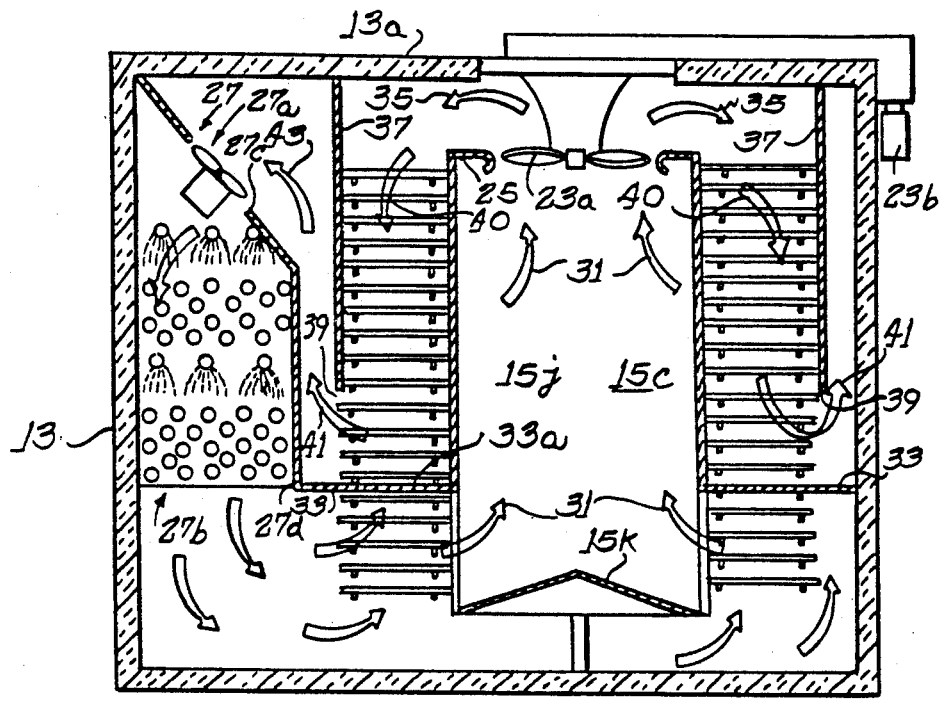
FIG. 2 is a schematic showing of a helical conveyor food freezer embodying the invention and illustrating the path of circulation of the atmosphere gas.

The air flow pattern to be described in connection with FIGS. 2 and 3 has the advantage of providing the coldest atmosphere gas to the warmest products entering the freezer to achieve surface freezing as quickly as possible. Also, it achieves high efficiency by passing all of the cooling atmosphere gas across the food products with no shortcuts or parallel return paths. This results in the maximum extraction of heat from the products by the cooling gas. The difference between the embodiments shown schematically in FIG. 2 and in FIG. 3 relates to the method of cooling the circulating atmosphere gas. In FIG. 2, the system is cooled entirely by mechanical refrigeration. Use of the term "mechanical refrigeration" herein is intended to cover apparatus in which a cooling medium, or refrigerant, goes through a cycle so that it is recovered and reused. Generally, a vapor compression cycle is employed wherein the liquid refrigerant is evaporated in a low pressure region, i.e., an evaporator, to produce cooling and is subsequently withdrawn to a compressor where the pressure and temperature of the gaseous refrigerant are raised. The gaseous refrigerant is then transferred to a condenser where its heat is discharged to the environment and the refrigerant liquifies and is stored in a receiver until such time that it is to be recycled through an expansion valve back into the evaporator.

Use of the term "cryogenically cooled" or "cryogenic refrigeration" herein is intended to over methods or apparatus in which a liquified gas, usually carbon dioxide or nitrogen, is allowed to expand and evaporate, producing temperatures of $-110°$ F. or below. Usually the liquified gas or cryogen is expended by discharge to the atmosphere after the desired use has been made of its capacity to absorb heat in carrying out a cooling or freezing operation.

In the embodiment illustrated schematically in FIG. 2, there is provided a mechanical refrigeration unit or apparatus 27 which includes air circulation means 27a and evaporator coils 27b positioned within the enclosure 13. The compressor and condenser for such a mechanical refrigeration apparatus would typically be mounted outside of the enclosure 13. The atmosphere gas to be cooled by the mechanical refrigeration apparatus 27 is drawn in by the fan 27a through an opening 27c and, after passing over the evaporator coils or heat exchange coils 27b, is discharged downwardly through an opening 27d.

As shown by the arrows 29, the discharging cooled atmosphere gas is directed through the lowermost flights of the conveyor 15 inwardly toward the volume enclosed by the cage 15c. The conical wall 15k restricts upward movement of the cooled atmosphere gas, forcing it to circulate around the bottom of the enclosure 13 where it may enter the cage 15c through the annular opening adjacent the lowermost flights only by passing across the food products supported on the conveyor.

The pattern of flow as described causes the coolest atmosphere gas provided by the mechanical refrigeration apparatus 27 to be directed across the incoming products on the conveyor 15. The coldest atmosphere gas, therefore, is the most effective in rapidly freezing the exterior surface of the food products to thereby minimize the moisture loss or dehydration in the food products. After the atmosphere gas passes across the lowermost flights of the conveyor 15, it passes upwardly within the cage 15c, as shown by the arrows 31. In the specification and the claims, the products on the lower flights of the conveyor which are subjected to the initial flow of atmosphere gas passing radially inwardly will be referred to as within "a first cooling zone," whereas the remainder of the flights of the conveyor 15 will be referred to as within "a second cooling zone", the function of which will be described in more detail below. It is noted that the first cooling zone and the second cooling zone are separated by a horizontal wall 33 which extends from the sidewalls of the enclosure 13 to the cylindrical wall 15j within the cage 15c. The portion of the horizontal wall 33 outside of the conveyor 15 is interrupted by the mechanical refrigeration unit 27 which extends through the wall 33 in order to draw in atmosphere gas from the area above the wall 33 and discharge it below the wall 33. The horizontal wall 33 includes an annular, somewhat spiral, portion 33a which is interleaved between the flights of the conveyor 15 to divide or separate the first cooling zone from the second cooling zone.

At the top of the conveyor 15, the fan 23 draws the atmosphere gas upwardly and circulates it outwardly, as shown by the arrows 35, in the area beneath a top wall 13a of the enclosure 13. In order to redirect downwardly the outwardly moving atmosphere gas as indicated by the arrows 35, there is provided a cylindrical baffle 37 which extends from the top wall 13a downwardly to a level spaced above the horizontal wall 33 so as to leave an annular discharge opening 39 located slightly below the midpoint of the conveyor 15. Thus, the atmosphere gas enters the top flights of the conveyor 15 moving vertically downwardly between the cylindrical walls 15j and 37 as shown by the arrows 40.

When the downwardly directed atmosphere gas, as indicated by the arrows 40, reaches the horizontal wall 33, including the annular portion 33a, the atmosphere gas moves outwardly, as shown by the arrows 41. As the atmosphere gas leaves the area of the conveyor 15 through the annular opening 39, it moves around and upwardly, as indicated by the arrows 43, to the intake 27c of the mechanical refrigeration apparatus 27.

To appreciate the effectiveness of the path of the atmosphere gas, as illustrated in FIG. 2, it is necessary to consider the relative temperatures of the food products on the conveyor 15 and the atmosphere gas circulated from the first cooling zone to the second cooling zone and back to the mechanical refrigeration apparatus 27. The atmosphere gas is at its coldest as it moves radially through the products on the conveyor flights in the first cooling zone, thereby creating a crust on the exterior of the food products to eliminate further dehydration. This passage of the cooling atmosphere gas through the first cooling zone raises its temperature somewhat. As the atmosphere gas moves downwardly through the flights of the conveyor 15, it is at its coldest temperature at the top of the enclosure 13, when it engages the food products immediately before they exit the freezer 11, at which time they are completely frozen. As the atmosphere gas reaches its highest temperature before circulating back to the refrigeration apparatus, it encounters the warmest of the products within the second cooling zone. This pattern of having the atmosphere gas moved in the opposite direction from the direction in which the food products are transported by the conveyor results in maintaining a fairly constant temperature differential between the products and the cooling atmosphere, achieving effective heat transfer with the maximum amount of cooling extracted from the circulating atmosphere gas.

Figure 3:
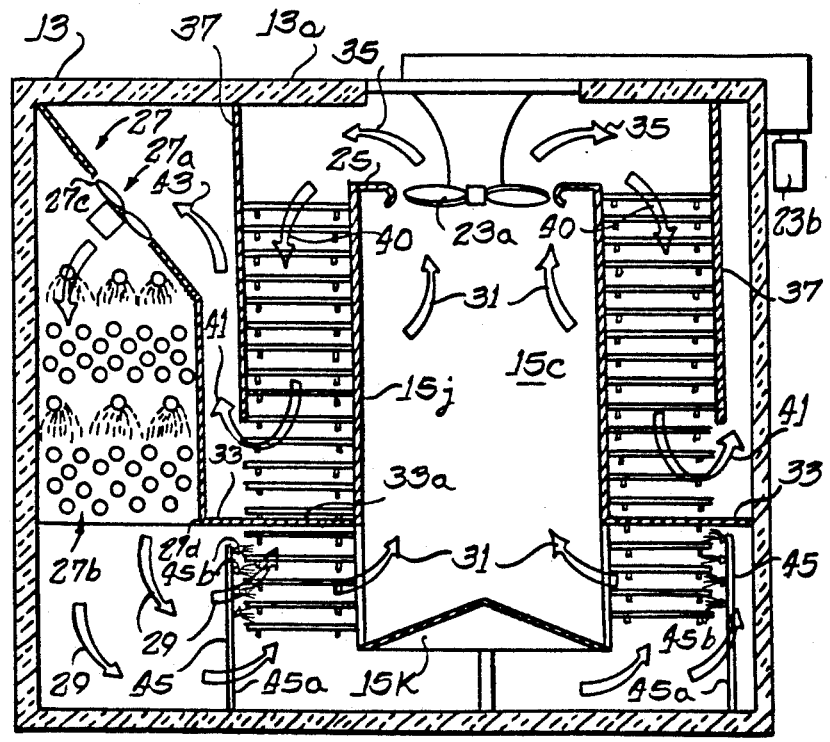
FIG. 3 is a schematic showing of another embodiment of a helical conveyor food freezer embodying the invention and illustrating the path of circulation of the atmosphere gas.

The schematic diagram of the air flow in FIG. 3 is essentially the same as the air flow pattern shown and described in connection with FIG. 2. Accordingly, the same reference numerals have been employed to indicate the parts in FIG. 3 which correspond to those in FIG. 2, including the reference numeral designations for the arrows showing the path of the circulating atmosphere gas.

Figure 6:
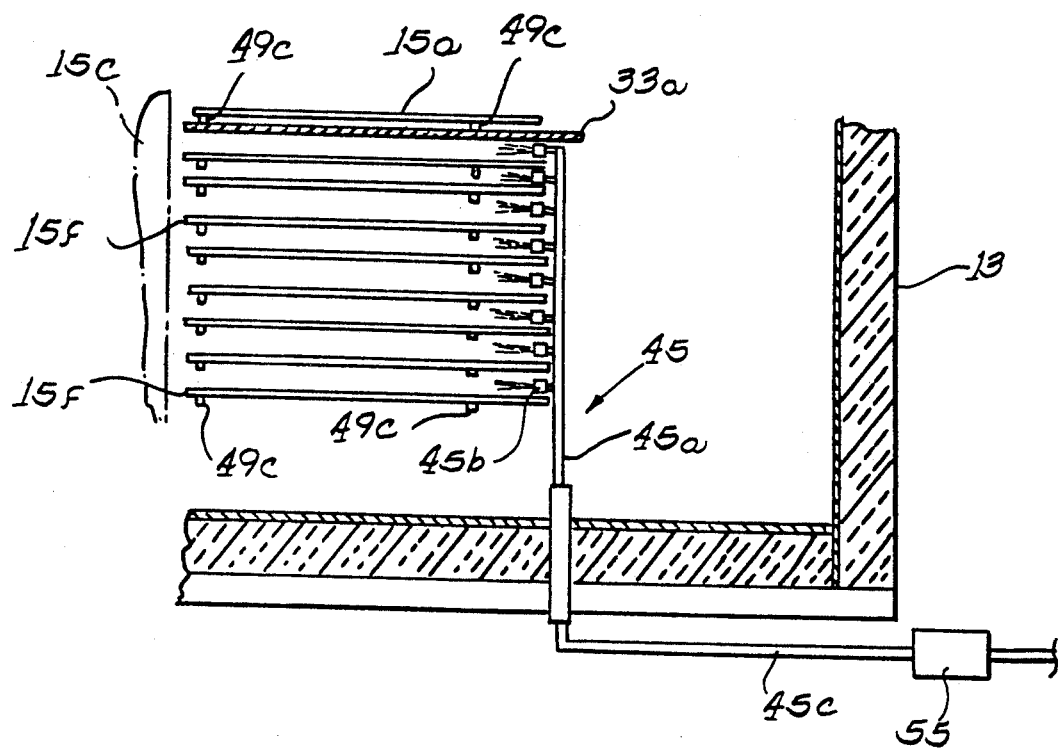
FIG. 6 is an enlarged, fragmentary vertical sectional view showing one of the cryogenic spray headers.

The basic difference involves the addition of cryogenic cooling apparatus 45 adjacent the first cooling zone. As shown in FIG. 6, the cryogenic refrigeration apparatus 45 takes the form of a series of headers 45a, supporting spray nozzles 45b, which are level with and directed horizontally across the food products on the lowermost flights of the conveyor 15 within the first cooling zone. In order to best utilize the space within the first cooling zone for the cryogenic cooling, if desired, there may be as many as eight or more peripherally spaced headers with nozzles directed radially across the food products on the conveyor 15. The headers may be individually controlled so that the amount and proportion of the cryogenic refrigeration may be selectively varied depending on the types of food being processed and the rate of processing.

When the freezer 11 is used in the combination mode, the mechanical refrigeration apparatus 27 functions to cool the circulating atmosphere gas and the cryogenic refrigeration 45 combines to increase the rate of freezing in the food products within the first and second cooling zones. The use of the cryogenic spray from the nozzles 45b reduces the time required to create the external crust on the food products which substantially eliminates further dehydration. A cryogenic liquid or snow produced from the spray nozzles 45b lowers the temperature of the food products and, as the cryogen is circulated inwardly and upwardly as indicated by the arrows 31, provides a lower atmosphere gas temperature than that provided by the mechanical refrigeration apparatus 27 operating alone. This lower atmosphere gas temperature results in faster cooling of the food products within the second cooling zone, thereby permitting a more rapid rate of processing than would be permitted by the use of the mechanical refrigeration 27 operating alone.

FIGS. 1, 4 and 5 illustrate a preferred embodiment which utilizes the air circulation pattern shown schematically in FIGS. 2 and 3. The mechanical refrigeration apparatus 27 shown generally and schematically in FIGS. 2 and 3, takes the form of two units 27 and 27' which are identical, having atmospheric gas circulating means 27a, heat exchange coils 27b, gas intake openings 27c, and gas discharge openings 27d. The evaporator coils and gas circulation means may take the form of the split coil system disclosed and claimed in the commonly-assigned copending application Ser. No. 705,119, filed May 24, 1991. The evaporator coils disclosed and claimed therein include liquid spray means which permit cleaning and sanitizing of the evaporator coils in position in the freezer 11.

As is evident from FIG. 4 of the drawings, each of the mechanical refrigeration units 27 and 27' includes multiple fans 27a associated with intake openings 27c. Gas discharge openings 27d open laterally toward the conveyor 15 to allow the cooled atmosphere gas to pass in and around the lowermost flights of the conveyor 15 within the first cooling zone.

In order to assure good distribution of the cooling air from the openings 27d to the entire circumference of the conveyor 15 within the first cooling zone, it may be necessary to employ perforate cylindrical baffles or wall segments 36 surrounding the conveyor 15 below the horizontal wall 33. In the food freezer 11, the velocity of atmosphere gas circulated through the mechanical refrigeration units 27 and 27' may be on the order of 2000 feet/minute. A gas velocity of this size would have a tendency to blow the food products off of the conveyor 15. Accordingly, wall segments 36 are positioned in front of the openings 27d and adjacent the periphery to provide a velocity drop by creating a back pressure. The two cylindrical wall segments 36 extend about 110° around the axis of the conveyor 15, with the periphery at the sides away from the openings 27d being unobstructed by the walls 36. The resulting atmosphere gas velocity across the flights 15f of the conveyor within the first cooling zone would be on the order of 400 to 800 feet/minute as a consequence of the wall segments 36. The wall segments 36 extend from the horizontal wall 33 to the bottom wall of the enclosure 13, with openings being provided for the cryogen nozzles 45b to direct cryogen through the wall segments 36 onto the food products on the conveyor 15. In some installations, it may be desirable to extend the cylindrical wall segments 36 to form a full perforate cylindrical wall extending completely around the conveyor 15 to lessen the atmosphere gas velocity flowing inwardly in the first cooling zone.

Figure 7:
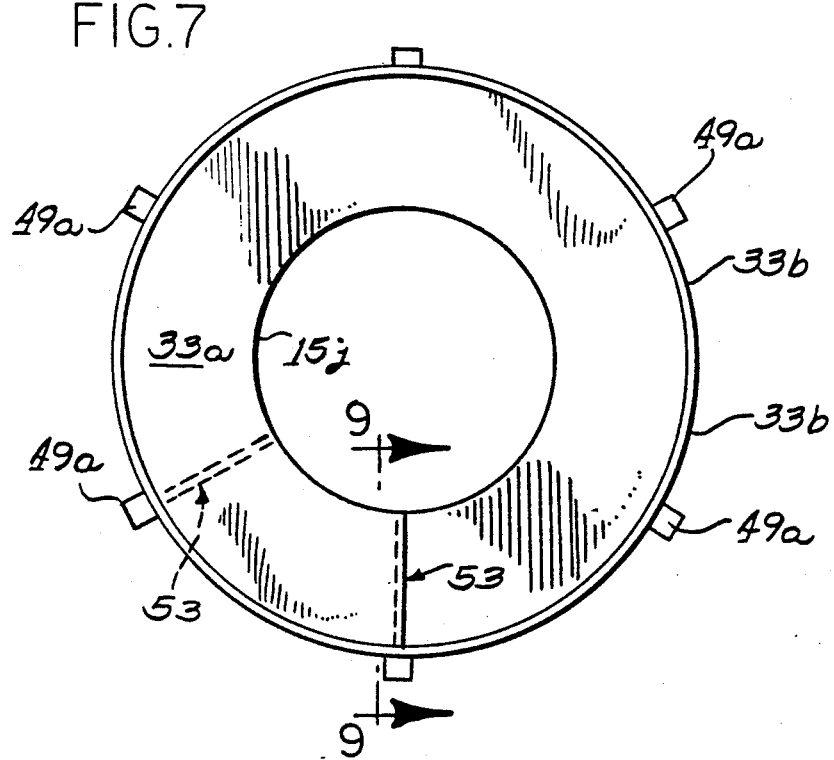
FIG. 7 is a schematic horizontal sectional view of a baffle usable between the various temperature zones.

The manner in which the wall portion 33a is disposed between the first cooling zone and second cooling zone is best shown in FIGS. 7, 8 and 9. In the plan view of FIG. 7, the wall portion 33a is shown as having an annular shape. It is in a spiral form with the uppermost end positioned at the center, lower area in FIG. 7 with the lower end overlapping about 60° around the axis of the cage of the conveyor 15. As shown therein, the flights 15f of the conveyor 15 are supported on a frame 49 which includes vertical frame members 49a, horizontal frame members 49b and spiraling rails 49c, which support the belt 15a. The annular portion 33a of the horizontal wall 33 is secured to the underside of the supporting rails 49c as is best shown in FIG. 9. The annular wall 33a extends around one complete flight 15f of the conveyor 15, in order to provide overlapping ends which define an opening 51, as shown in FIG. B, whereby the conveyor belt 15a may extend through the opening 51 to pass from the first cooling zone to the second cooling zone. The opening 51 is closed by a curtain 53 formed by flexible fingers which permit the food products on the conveyor 15 to move through the opening 51 without any appreciable leakage of the atmosphere gas therethrough. As shown in FIG. 7, a second curtain 53 may be hung from the wall portion 33a in alignment with the lower end of the wall portion 33a to provide a better seal between the first and second cooling zones. The annular wall portion 33a is generally on the same level as the horizontal wall 33, there being an additional cylindrical wall 33b that extends around the wall portion 33a as shown in FIGS. 8 and 9. The horizontal wall 33 is secured to the wall 33b.

As indicated above, the cryogen cooling apparatus 45 includes headers 45a and nozzles or dispensing valves 45b. As shown in FIG. 4, there are eight separate headers provided around the periphery of the conveyor 15. Each of the headers 45a is supplied by a feedline 45c, one of which is shown in FIG. 6. While the details of the structure and the layout of the feedlines 45c are not shown, it is contemplated that the feedlines 45c would be constructed in a with the teaching of the above-cited Lang et al., U.S. Pat. No. 4,953,365 to eliminate the possibility of feedline blockages by frozen cryogen. As is evident from FIG. 6, each header 45a supports a plurality of nozzles 45b which are directed horizontally across the food products on the surface of the conveyor flights 15f. The specific arrangement and number of headers and nozzles are not critical to the practice of the invention and may be varied to meet the requirements of a particular installation to provide adequate cryogen to accomplish the preliminary cooling and surface freezing of the food products involved in the first cooling zone. These requirements would depend on the nature of the food products, the mass of the products, incoming temperature, conveyor speed, and the selection based on cost considerations as to the proportion of cryogen cooling to mechanical refrigeration cooling to be used in a particular run of food products. By having a separate control 55, associated with each of the cryogen feedlines 45c, the amounts of cryogen supplied may be easily varied.

In the operation of the freezer 11 of FIGS. 4 through 6, the food to be frozen is placed on the outer end of the entrance portion 15g of the conveyor 15 where it is carried into the enclosure 13 through the entrance opening 17 into the first cooling zone as it moves onto the lowermost loop 15f of the helical conveyor 15. At the entrance opening 17, there is provided a dilution chamber 57 which includes a blower-controlled exhaust duct 57a. The dilution chamber 57 is a known means for controlling the entrance of outside air into enclosure 13 and regulating the outflow of cryogen vapor from the enclosure 13 through the opening 17. By automatically controlling the flow of atmosphere gas exhausted through the duct 57a and the flow of cryogen into the enclosure 13, the ingress of air and egress of atmosphere gas through the opening 17 may be controlled. A similar dilution control chamber 59 and blower-controlled exhaust duct 59a is provided at the exit opening 19 to control the ingress of air and egress of atmosphere gas.

The entrance and exit opening seals of the type described above are disclosed in detail in commonly-assigned U.S. Pat. No. 4,947,654, which is incorporated by reference as fully set forth herein. There are, of course, other types of seals which would be suitable for use in this application.

As the food products progress upwardly on the helical conveyor 15, through the first cooling zone, the food products are subjected to cold atmosphere gas discharge from the mechanical refrigeration units 27 and 27'. At the same time, if for cost and quality reasons it was decided to use cryogen cooling in combination with the mechanical refrigeration, the liquid cryogen is sprayed from the nozzles 45b, horizontally across the food products on the conveyor 15. As stated above, the specific arrangement of the cryogen feedlines 45c forms no part of the present invention. Suitable controls may be provided to permit selection of any number of the cryogen spray headers located around the lowermost flights of the conveyor 15 and within the first cooling zone.

One of the objectives in the first cooling zone is to freeze the exterior surface of the food products being processed to minimize the moisture loss and avoid any deterioration of the food products. Depending on the mass of the products, the temperature of the food products and the speed of the belt 15a, more or less cryogen may be required on the headers 45a. If the economics of the process require it, the conveyor 15 may be run at such a speed that the mechanical refrigeration units 27 and 27' freeze the exterior surface of the food products so that no cryogen cooling is required.

However, as a consequence of the flow pattern of the cooling atmosphere gas within the freezer 11, a rate of cooling in the first cooling zone will be greater than the rate of cooling in the second cooling zone. Accordingly, it is contemplated that the process would be operated so that the exterior surface freezing has been accomplished in the first cooling zone regardless of the proportion of mechanical refrigeration cooling to cryogen cooling. When the food products exit the first cooling zone through the opening 51, the flexible curtain 53 minimizes an outflow of cool air into the second cooling The second cooling zone is defined by the outer cylindrical wall 37 and the imperforate wall 15j of the conveyor cage 15c. The products on the conveyor 15 enter the lower end of the second cooling zone, while the atmosphere gas enters the upper end of the second cooling zone, and provides a type of counter flow where the food products move upwardly on a conveyor 15 and the cooling air moves downwardly through the flights of the helical conveyor. Thus, the colder atmosphere gas engages the colder products on the conveyor on the upper flights and, on the lower flights, the warmer atmosphere gas engages the warmer or less-frozen products. This produces an efficient use of the cooling capacity of the atmosphere gas since all of the gas is circulated through all of the food products with no gas being short-circuited, so to speak, as it returns to the refrigeration means.

In order to permit the exit portion 15h of the conveyor 15 to extend out of the upper portion of the second cooling zone without allowing the circulating atmosphere gas to bypass the down flow through the conveyor 15, there is provided a sealed passageway 38 which extends through the cylindrical wall 37 surrounding part of the exit portion 15h, as best shown in FIGS. 1 and 4. The passageway 38 closely encloses the exit portion 15h with sufficient clearance to allow the food products on the conveyor 15 to pass to the exit opening 19. Spaced curtains 38a allow the food products to pass through the passageway 38 on the conveyor 15 while restricting the movement of atmosphere gas through the passageway.

It should be understood that the specific details as to the relative size of the first cooling zone as compared to the second cooling zone will depend primarily on the types of food products to be frozen and the selected proportions of cryogenic cooling to mechanical refrigeration cooling that will be dictated by the economics of the process. Accordingly, the horizontal wall 33 that divides the enclosure 13 into an upper low-pressure area and a bottom high-pressure area as well as separating the first and second cooling zones, might be located more toward the center of the conveyor 15 or more towards the lower end of the conveyor 15. Regardless of the elevation of the horizontal wall 33, the principle of operation will be the same, including the use of first and second cooling zones with the gas flow pattern as described in the schematic diagrams of FIGS. 2 and 3.

As indicated above, the manner in which the freezer 11 would be operated insofar as the proportion of mechanical refrigeration to cryogenic refrigeration depends on the food products being frozen, their incoming temperature, mass of the product, cost per pound, type of food and on the rate at which the freezer is to be operated. While the faster freezing and lower product dehydration are well known advantages of cryogenic freezing, the fact that cryogenic freezing is often more than ten times as costly as mechanical freezing is a significant deterrent to the use of pure cryogenic freezing. In many applications in which the product being frozen is low in cost per pound, mechanical freezing is preferred since the higher dehydration losses associated with mechanical freezers cannot even begin to equal the high cryogen costs required to minimize those losses.

On the other hand, when the product cost exceeds about $1.50 per pound, there will be many instances in which the savings resulting from lowered dehydration or weight loss in the product will more than pay for the use of some cryogenic freezing to prevent that weight loss. As to exactly what price per pound justifies going to cryogen freezing depends on the amount of heat that must be removed to create a crust or frozen surface on the product. For example, if the freezing process for a particular product requires 70 BTUs to establish a crust, the cost per pound of product to justify cryogenic freezing would be about $1.25 per pound, while if the process requires 100 BTUs to establish crust, the cost per pound would be $1.75 per pound. On the basis of empirical data, it has been established that cryogenic cooling will give a dehydration weight loss of about 1% as compared to 3.2% for mechanical refrigeration. This added weight loss with mechanical refrigeration is a result of the fact that the circulating gas or the air cooled mechanically will be dry and initially at a temperature of $-40°$ F. or $-50°$ F., while liquid $CO_2$ used in cryogenic freezers will provide a low temperature of about $-110°$ F. As a consequence, with the cryogenic freezer there is less time for dehydration to occur before the exterior of the product is frozen, and the heat exchange medium has less tendency to dehydrate the food prior to this freezing of the exterior.

The present invention provides a unique combination freezer that is adapted for most efficient use of mechanically refrigerated atmosphere when it is advantageous to freeze food products with pure mechanical refrigeration. At the same time, the freezer has the capacity to be operated as a combination freezer using appropriate percentages of cryogenic freezing to achieve the economic advantages of minimizing dehydration when justified by the product cost. Whether operated as a mechanical freezer or as a combination freezer, the path of atmosphere gas circulation through the freezer is such that the incoming food products are cooled in the first cooling zone by the lowest temperature atmosphere gas available in the system in order to minimize dehydration of the products. Thereafter, in order to obtain the maximum cooling effect from the atmosphere gas before circulating it back to the refrigeration apparatus, the atmosphere gas is circulated across the food products in the direction opposite to the direction in which the products are moving. Thus in the second cooling zone, the cooling atmosphere gas is first circulated across the food products about to exit the freezer and then downwardly through the upwardly moving conveyor engaging the warmest food products just before being recirculated to the refrigeration apparatus. This pattern effectively provides a relatively constant temperature differential between the atmosphere gas circulating in the second cooling zone and the food product. There is another important advantage resulting from circulating all of the atmosphere gas across all of the food products with none being short-circuited back to the refrigeration means. The atmosphere gas is dry and contains little moisture as it exits from the refrigeration means. As a consequence it tends to absorb moisture from the food products, becoming saturated very early in its circulation through the enclosure. Once the atmosphere gas is saturated, it tends to absorb little added moisture from the food which, of course, reduces dehydration during the later stages of the freezing, as in the second cooling zone. On the other hand, if saturated atmosphere gas is circulated back to the refrigeration means at several stages rather than after passing over all of the food products, more moisture is extracted from the food products. Thus the gas flow pattern of the present invention results in less dehydration of food products because the atmosphere gas is maintained at a moisture saturated level for a longer period of time.

There have been combination mechanical and cryogenic freezers which involve separated cryogenic freezer portions and mechanical freezing portions. There is a problem in such systems with the unfrozen interior of the food product tending to thaw the crust or frozen exterior surface as the food products move from the cryogenic portion to the mechanical freezer portion. In the present combination freezer, the two cooling zones are in the same enclosure and provide continuous cooling of the food products so that no such surface thawing can occur. In addition, the close proximity of the two cooling zones permits the circulation of the same cooling 1 medium through both cooling zones to accomplish the surface and interior freezing of the products. In this connection, it should be understood that when the freezer 11 is operated using both mechanical and cryogenic cooling, the cryogen vapor will be carried into the second cooling zone to combine with the atmosphere gas cooled by the mechanical refrigeration to cool the food products. This further extraction of heat from the food products and warming of the cryogen vapor increases the efficiencies of the freezer and allows it to be operated more economically.

Under normal operating conditions, the temperatures in both of the cooling zones will be on the order of $-40°$ F. to $-50°$ F. Although the liquid $CO_2$ itself will be on the order of $-110°$ F., the freezing of the food products cryogenically is primarily by surface contact rather than by lowering the ambient temperature level in the first cooling zone. The freezer 11 would normally be operated with as little cryogen as necessary to accomplish the objective of freezing the exterior surface of the food products. If too much cryogen is used in the first cooling zone, the carryover into the second cooling zone and on to the refrigeration apparatus tends to reduce the efficiency of the apparatus. If too much cryogen carries over into the mechanical refrigeration apparatus, the absence of a heat load on the heat exchanger coils 27b will cause the mechanical refrigeration unit to shut down. Accordingly, while it is an advantage to have the first and second cooling zones closely coupled together, the cryogenic cooling for the freezer 11 must be limited so that it does not overwhelm the mechanical refrigeration apparatus thereby eliminating the cost advantages inherent in the combination freezer.

In order to increase the flexibility of the continuous freezer of the present invention, it is contemplated that further variations may be provided in the arrangement of the cryogen cooling, while still incorporating the atmosphere flow pattern as illustrated in FIGS. 2 and 3. In FIG. 10 there is illustrated an alternative embodiment of the invention in which cryogen injection headers 70 are mounted within the freezer 11 immediately above the uppermost flight 15f of the conveyor 15. The headers 70 include spaced nozzles 70a disposed across the conveyor to cryogenically cool the food products passing beneath the nozzles 70a. The headers 70 are arranged in a horizontal plane extending generally radially of the axis of the cage 15c of the conveyor 15 with three or four peripherally spaced headers preferably being provided.

The use of the overhead cryogenic cooling at the top of the second cooling zone allows for the increased use of cryogenic cooling as compared to mechanical cooling. There are applications in which the higher costs of increasing the proportion of cryogenic to mechanical cooling is justified based on product quality considerations or savings based on moisture loss in the product.

As shown in the embodiment of the invention in FIG. 11, the mechanical refrigeration may be combined with the cryogenic cooling in a hybrid system in which the cryogenic cooling means is combined with the mechanical refrigeration to provide a lower cost cooling in a combination freezer using mechanical and cryogenic cooling than would be possible where the two cooling means are independent of each other. The freezer 111 is shown schematically in FIG. 11 as including mechanical refrigeration apparatus 127 and cryogenic cooling apparatus 145 disposed within an insulated enclosure 113 With the same air flow as disclosed above in connection with the embodiment of FIGS. 1, 4 and 5.

The mechanical refrigeration apparatus 127 includes an evaporator or heat exchange coils 127a within the enclosure 113 and refrigeration skid 127b, which includes a compressor and condenser. Refrigerant lines 127c and 127d extend between the skid 127b and the heat exchange coils 127a.

The cryogenic cooling apparatus 145 includes a tank 147 within which liquid $CO_2$ is stored at 300 psi and 0° F. The liquid $CO_2$ is supplied through a conduit 149 to a shell in tube heat exchanger 151 in which the liquid $CO_2$ is cooled by the refrigerant in the mechanical refrigeration line 127d which delivers refrigerant to the heat exchange coils 127a within the enclosure 113. The heat exchanger 151 is designed to lower the temperature of the cryogen by 25° F. to 55° F., i.e., from 0° F. to between −25° F. and −55° F. Thus the refrigerant temperature in the conduit 127d is on the order of −35° to −65° F. on entering the heat exchanger 151. The efficiency of the heat exchanger 151 is such that it may lower the cryogen temperature to within ten degrees Fahrenheit of the mechanical refrigerant.

The liquid $CO_2$ from the heat exchanger 151 then passes through conduit 153 to a cryogen control 155 which is adapted to meter the amount of cryogen supplied through conduit 157 to the nozzles within the enclosure 113. A conduit 159 extending from the tank 147 to the control 155 provides $CO_2$ vapor at a pressure to operate instruments and to purge liquid $CO_2$ from lines when necessary.

The above described embodiment, including the heat exchange between the refrigerants in the cryogenic and mechanical refrigeration systems, provides improved efficiency in the cooling accomplished by the cryogenic cooling as compared to the operation of the mechanical cryogenic systems separately. By subcooling the cryogen from 0° F. to between −25° F. and −55° F., the cryogen is increased in its cooling effectiveness by 10 to 15%. This increase in effectiveness of the cryogen permits reducing the amount of cryogen used by on the order of 11%. Although the heat removed from the cryogen by the mechanical refrigerant will place an additional load on the mechanical refrigeration unit, it is well known that the BTUs removed by the mechanical refrigeration are considerably cheaper than those removed through the use of cryogenic cooling. Accordingly, by lessening the amount of cryogen required to perform a given amount of food cooling, a savings is achieved if that can be accomplished through the use of mechanical refrigeration.

While the disclosed embodiments of the invention include an ascending spiral conveyor, it is contemplated that a descending spiral conveyor would also be applicable to the present invention. The second cooling zone would then be located beneath the first freezing zone without detracting from the benefits and advantages inherent in the disclosed invention.

Although the invention has been described with regard to a preferred embodiment, it should be understood that various changes and modifications as would be obvious to one having the ordinary skill in this art may be made without departing from the scope of the invention which is defined in the appended claims.

What is claimed is:

1. A freezer for freezing food products comprising:
   an insulated enclosure having a inlet and an outlet,
   a helical conveyor disposed within said enclosure and including a plurality of superimposed flights for transporting food products along a helical path around a vertical axis from said inlet to said outlet, said conveyor including a foraminous portion which supports said food products,
   refrigeration apparatus within said enclosure including heat exchange means and gas circulation means to cool an atmosphere gas and circulate said atmosphere gas through and across said conveyor into contact with said food products on said conveyor,
   baffle means positioned adjacent to said conveyor to direct the circulating atmosphere gas through and across said conveyor to provide a first cooling zone in which said food products are cooled rapidly and a second cooling zone in which said food products are cooled less rapidly at a substantially uniform rate,
   a plurality of the flights of said helical conveyor being disposed in said first cooling zone adjacent to said inlet, the flights of said helical conveyor positioned out of said first cooling zone being positioned in said second cooling zone,
   said refrigeration apparatus having an output supplying cooled atmosphere gas to the portion of said enclosure adjacent to said first cooling zone and an input for drawing in and recirculating atmosphere gas which has extracted heat from said food products, said cooled atmosphere gas in said first cooling zone passing horizontally across said flights inwardly toward said vertical axis, said baffle means directing said atmosphere gas from said first cooling zone vertically within said helical conveyor in a first direction and then vertically in the reverse direction through all of the flights of said helical conveyor within said second cooling zone and then to said input for said refrigeration apparatus.

2. A freezer for freezing food products as recited in claim 1 wherein said baffle means includes a generally horizontal wall dividing said enclosure into a high pressure region disposed in one portion of said enclosure and a lower pressure region disposed in another portion of said enclosure, said refrigeration apparatus output being in said high pressure region and said refrigeration apparatus input being in said lower pressure region.

3. A freezer for freezing food products as recited in claim 2 wherein said horizontal wall includes a central opening within said helical conveyor through which said atmosphere gas passes from said first cooling zone to said second cooling zone.

4. A freezer for freezing food products as recited in claim 3 wherein said horizontal wall includes an opening through which said conveyor extends in passing from said first cooling zone to said second cooling zone.

5. A freezer for freezing food products as recited in claim 1 wherein said baffle means includes a generally horizontal annular wall separating the flights of said conveyor in said first cooling zone from the flights of said conveyor in said second cooling zone.

6. A freezer for freezing food products as recited in claim 5 wherein said baffle means includes first and second cylindrical walls coaxial with said vertical axis and defining said second cooling zone, said first cylindrical wall being disposed within said helical conveyor and having a one end connected to said horizontal annular wall, said first cylindrical wall having an end spaced from a wall of said enclosure and positioned adjacent the end of said conveyor at said outlet, said second cylindrical wall surrounding said conveyor and having one end engaged with said enclosure wall and another end spaced from said horizontal annular wall.

7. A freezer for freezing food products as recited in claim 6 including a third cylindrical wall surrounding said helical conveyor disposed in said first cooling zone, said third cylindrical wall being foraminous to pass atmosphere gas moving from said output of said refrigeration apparatus across said flights of said conveyor in said first cooling zone and to reduce the velocity of said atmosphere gas.

8. A freezer for freezing food products as recited in claim 1 wherein said refrigeration apparatus includes mechanical refrigeration apparatus with a heat exchanger disposed within said enclosure and cryogenic cooling apparatus, said cryogenic cooling apparatus including means for supplying a liquid cryogen and spraying said liquid cryogen across the food products on said conveyor in said first cooling zone.

9. A freezer for freezing food products as recited in claim 8 wherein said mechanical refrigeration apparatus and said cryogenic cooling apparatus are connected to a common heat exchanger wherein a mechanical refrigerant circulated by said mechanical refrigeration apparatus removes heat from said liquid cryogen to subcool said liquid cryogen before entering said enclosure to be sprayed across said food products.

10. A freezer for freezing food products as recited in claim 8 wherein said helical conveyor transports food products upwardly within said enclosure, said plurality of flights of said conveyor in said first cooling zone being the lowermost flights of said conveyor, said enclosure having a top wall and a bottom wall, said baffle means including a first cylindrical baffle within the flights of said conveyor in said second cooling zone and co-extensive therewith, and including a second cylindrical baffle extending downwardly from said top wall.

11. A freezer for freezing food products as recited in claim 10 including a third cylindrical baffle means being coaxial with said first and second cylindrical baffles and extending around the flights of said conveyor in said first cooling zone, said third cylindrical baffle means being a perforate wall to lessen the velocity of the atmosphere gas passing horizontally across said flights of said conveyor in said first cooling zone.

12. A food cooling apparatus for the continuous cooling of food products, comprising:
a thermally insulated enclosure;
a helical conveyor disposed within said enclosure including a hollow cylindrical frame driven for rotation about a vertical axis, said frame being surrounded by and in driving engagement with a plurality of superimposed flights of a continuous foraminous conveyor for transporting food products upwardly along a helical path;
refrigeration apparatus within said enclosure including heat exchange means and blower means to cool an atmosphere gas within said enclosure and circulate said atmosphere gas through and across said conveyor into contact with said food products on said conveyor;
means for circulating said cooled atmosphere gas from said refrigeration apparatus immediately in a horizontal plane across the food products on a plurality of the lowermost of said flights of said conveyor into said hollow cylindrical frame for rapidly cooling incoming food products, said blower means circulating the atmosphere gas from the lowermost flights of said conveyor upwardly within said hollow cylindrical frame to a height above the uppermost flight of said conveyor and then radially outwardly of said vertical axis and then downwardly through all of the flights of said conveyor other than said plurality of said lowermost of said flights of said conveyor; and
horizontal wall means extending substantially horizontally to separate said lowermost flights of said helical conveyor from the remaining flights of said helical conveyor and to cause the downwardly directed atmosphere gas to move radially outwardly to said refrigeration apparatus.

13. Food cooling apparatus as recited in claim 12 wherein all of the atmosphere gas cooled by said refrigeration apparatus first passes by parallel paths through said plurality of lowermost flights of said conveyor and then passes successively through the remaining flights of said conveyor starting with the uppermost flight and progressing downwardly therefrom to obtain the maximum cooling efficiency from the atmosphere gas cooled by said refrigeration apparatus.

14. Food cooling apparatus as recited in claim 12 wherein said cylindrical frame is provided with a perforate wall adjacent said plurality of lowermost flights of said conveyor to permit said gas atmosphere to pass horizontally into said cylindrical frame, said cylindrical frame being provided with an imperforate wall extending upwardly from said perforate wall to the uppermost flight of said conveyor to prevent atmosphere gas from passing radially outwardly from said cylindrical frame.

15. Food cooling apparatus as recited in claim 14 including a cylindrical baffle surrounding said helical conveyor and confining the atmosphere gas passing downwardly through said flights of said conveyor from passing radially outwardly, said cylindrical baffle terminating at its lower end in vertically spaced relation to said horizontal wall means providing an annular opening through which atmosphere gas passes to said refrigeration apparatus.

16. A method of freezing food products using mechanical refrigeration means, comprising:
   providing a thermally insulated enclosure having top and bottom walls with an entrance opening adjacent one of said walls and an exit opening adjacent the other of said walls;
   providing a continuous conveyor for transporting food products from said entrance opening to said exit opening on a helical path around a vertical axis, said conveyor having a plurality of superimposed flights;
   refrigerating an atmosphere gas in said enclosure to a reduced temperature and circulating said atmosphere gas across and through said food products on said conveyor;
   subjecting a plurality of the flights of said conveyor adjacent to said one wall to the reduced temperature atmosphere gas produced by said refrigerating, thereby raising the temperature of a portion of the atmosphere gas; and
   circulating the raised temperature gas across the food products on said conveyor in a vertical direction opposite to the direction in which said conveyor transports said food products.

17. A method of freezing food products as recited in claim 16 wherein said continuous conveyor transports food products upwardly within said enclosure, and said plurality of flights are the lowermost flights of said continuous conveyor.

18. A method of freezing food products as recited in claim 17 including spraying a liquid cryogen on food products on said lowermost flights of said continuous conveyor to freeze the exterior surfaces of said food products quickly with said liquid cryogen or a combination of said liquid cryogen and refrigerated atmosphere gas.

19. Apparatus for freezing food products in a continuous process with an initial fast cooling stage to create an outer frozen surface to inhibit moisture loss, and a second stage in which food products are frozen completely at a rate which is slower than the rate of cooling during the initial fast cooling stage comprising:
   an insulated enclosure having an inlet for introducing food products into said enclosure and an outlet through which frozen food products are discharged;
   a continuous open mesh helical conveyor extending from said inlet to said outlet along a helical path having a plurality of superimposed flights extending around a vertical axis;
   refrigeration apparatus within said enclosure to cool atmosphere gas and circulate said atmosphere gas through and across said conveyor into contact with food products on said conveyor;
   means defining a first cooling zone in which said initial fast cooling of said products is accomplished, a plurality of the flights of said conveyor adjacent said inlet being within said first cooling zone;
   all of the atmosphere gas cooled by said refrigeration apparatus being initially discharged into said first cooling zone across said plurality of flights of said conveyor to subject said food products in said first cooling zone to atmosphere gas of the lowest temperature within said enclosure;
   means defining a second cooling zone in which said second stage of cooling of said food products is accomplished;
   said flights of said conveyor in said second cooling zone including all but said plurality in said first cooling zone and including flights of said conveyor adjacent said outlet; and
   means circulating atmosphere gas from said first cooling zone to the end of said helical conveyor adjacent said outlet and then circulating said atmosphere gas vertically through said flights of said conveyor within said second cooling zone.

20. Apparatus for freezing food products as recited in claim 19 wherein said first cooling zone is separated from said second cooling zone by an annular baffle interposed between adjacent flights of said conveyor, said baffle having superimposed spaced ends which define an opening between said first and second cooling zones.

21. An apparatus for freezing food products as recited in claim 19 wherein said refrigeration apparatus includes mechanical refrigeration means with a heat exchanger for cooling a recirculating atmosphere gas and cryogenic cooling means, said cryogenic cooling means including means for spraying a liquid cryogen across food products in said first cooling zone.

22. An apparatus for freezing food products as recited in claim 21 wherein said cryogenic cooling means includes means for spraying a liquid cryogen on food products on said conveyor in said second cooling zone.

23. An apparatus for freezing food products as recited in claim 20 wherein said helical conveyor includes a cylindrical cage within said flights to support and drive said helical conveyor, said cage having an imperforate, cylindrical wall to form a baffle to direct said atmosphere gas from said first cooling zone to said second cooling zone, a second cylindrical baffle co-axial with said cylindrical wall adjacent the periphery of said helical conveyor to direct said atmosphere gas through the flights of said conveyor in said second cooling zone.

24. An apparatus for freezing food products as recited in claim 23 wherein said enclosure includes a top wall and a bottom wall with said inlet being adjacent to said bottom wall, and said outlet being adjacent to said top wall, said helical conveyor transporting food products upwardly within said enclosure, said second cylindrical baffle extending downwardly from said top wall, a dividing wall dividing said enclosure into a low pressure area and high pressure area, said refrigeration apparatus extending through said dividing wall to draw in atmosphere gas from said low pressure area and discharge cooled atmosphere gas into said high pressure area, atmosphere gas circulating through said cage and said second cooling zone in moving from said high pressure area to said low pressure area.

25. An apparatus for freezing food products as recited in claim 23 including a fan for circulating atmosphere gas upwardly within said cage and outwardly into said second cooling zone.

* * * * *